United States Patent [19]

Naito

[11] Patent Number: 5,168,955
[45] Date of Patent: Dec. 8, 1992

[54] TRACTION CONTROL SYSTEM FOR FOUR-WHEEL DRIVE VEHICLE

[75] Inventor: Genpei Naito, Kanagawa, Japan

[73] Assignee: Nissan Motor Company, Limited, Japan

[21] Appl. No.: 594,154

[22] Filed: Oct. 9, 1990

[30] Foreign Application Priority Data

Oct. 9, 1989 [JP] Japan .................. 1-263731

[51] Int. Cl.⁵ .................................. B60K 17/348
[52] U.S. Cl. .................................. 180/197; 180/248; 180/249; 364/426.03
[58] Field of Search ............... 180/197, 248, 233, 244, 180/247, 249; 364/424.05, 426.01, 426.03

[56] References Cited

U.S. PATENT DOCUMENTS

| | | | |
|---|---|---|---|
| 4,890,685 | 1/1990 | Naito | 180/233 |
| 4,976,330 | 12/1990 | Matsumoto | 180/197 |
| 4,984,649 | 1/1991 | Leiber et al. | 180/197 |
| 5,004,064 | 4/1991 | Tezuka et al. | 180/248 |
| 5,014,809 | 5/1991 | Matsuda | 180/233 |

FOREIGN PATENT DOCUMENTS

| | | |
|---|---|---|
| 0189176 | 7/1986 | European Pat. Off. . |
| 0278588 | 8/1988 | European Pat. Off. . |
| 0314452 | 5/1989 | European Pat. Off. . |
| 0335335 | 10/1989 | European Pat. Off. ............ 180/233 |
| 3545546 | 7/1987 | Fed. Rep. of Germany . |
| 3741009 | 6/1988 | Fed. Rep. of Germany . |
| 61-268529 | 11/1986 | Japan . |
| 62-285130 | 12/1986 | Japan . |
| 61-285131 | 12/1986 | Japan . |
| 63-141831 | 6/1988 | Japan . |
| 63-170129 | 7/1988 | Japan . |

Primary Examiner—Margaret A. Focarino
Assistant Examiner—Anne Marie Boehler
Attorney, Agent, or Firm—Lowe, Price, LeBlanc & Becker

[57] ABSTRACT

A traction control system is provided which is applicable to a four-wheel drive vehicle in which a torque split system is incorporated. The torque split system is operable to distribute engine torque to front and rear wheels by an engine torque distribution ratio of front to rear wheels variable based on a difference in rotational speeds between the front and rear wheels. The traction control system is responsive to a slippage ratio of the rotational speeds of the wheels to a vehicle speed greater than a preselected threshold to reduce engine torque to control the traction of the wheels. Therefore, the traction control is effectively carried out while ensuring yaw control of a vehicle body by means of the torque split control.

4 Claims, 3 Drawing Sheets

TRACTION CONTROL SYSTEM FOR FOUR-WHEEL DRIVE VEHICLE

BACKGROUND OF THE INVENTION

1. Technical Field

The present invention relates generally to a traction control system for a four-wheel drive vehicle in which a torque split system is incorporated.

2. Background Art

Japanese Patent First Publication (tokkai) No. 63-141831 discloses a torque split control system for a four-wheel drive vehicle. This system may be incorporated in a four-wheel drive vehicle which gives priority to rear-wheel driving and operates such that driving torque delivered to the front wheels is increased according to increase in a rotational speed difference between the front and rear wheels to distribute driving torque to all four wheels, an increase ratio of the driving torque to the front wheels is lowered according to rear driven-wheel slippage resulting from increase in lateral acceleration acting on the vehicle body during turns.

Japanese Patent First Publications (tokkai) Nos. 61-268529, 61-285130, and 61-285131 disclose traction control systems for automotive vehicles.

Publication No. 61-268529 discloses a system wherein a minimum value is selected from among the rotational speeds of all wheels and an estimated vehicle speed to define this value as a threshold for reducing driving torque to preventing wheel spin from occurring.

Publication No. 61-285130 discloses a system which is adapted for reducing driving torque to prevent wheel spin from occurring based on an average value of the rotational speeds of all wheels.

Publication No. 61-285131 discloses a system which is adapted for selecting a minimum speed from among rotational speeds of all wheels to provide a threshold for reducing a driving torque to prevent wheel spin from occurring.

Further, Japanese Patent Publication No. 63-170129 discloses a system in which both a torque split controller and a traction controller are incorporated. This system is operable to engage a clutch disposed in a drive system before effecting traction control to establish four-wheel driving.

If a four-wheel drive vehicle is provided which has a simple combination of a torque split controller and a traction controller, the traction controller monitors wheel spin based on a rotational speed of any one wheel or an average speed of all four wheels to effect traction control. Thus, if yaw motion of the vehicle is controlled by the torque split control to allow a difference in rotational speeds between the front and rear wheels to be created according to turning conditions, the traction control must disenable the torque split control of yaw motion within a certain range to allow operation of the traction control. This results in control interference between both the traction control and torque split control.

In a case of a vehicle including only a torque split control system, a yaw moment, or an attitude angle of a vehicle body can be controlled, however this causes excess driving torque of the four wheels. Thus, reduced traction of all four wheels induces excessive yaw during turning, and the vehicle's turning circle becomes unacceptably wide.

Additionally, in the case of a four-wheel drive vehicle which includes both a torque split controller and a traction controller, since a clutch is locked before effecting traction control to establish direct-coupled four-wheel driving, yaw control of the vehicle body by the torque split control is not effected during traction control, losing effect of provision of the torque split control. Further, since all of four wheels are connected directly to an engine to establish the four-wheel driving during the traction control, the four wheels slip simultaneously. Therefore, the traction control which selects the lowest speed from among the four wheels cannot operate effectively, resulting in control no different from a system utilizing an average wheel speed.

It will be appreciated that clutch control of a torque split controlled four-wheel drive vehicle is operable to allow a difference in rotational speeds between the front and rear wheels which corresponds to a difference in turning circles thereof to occur. The driving torque to the rear wheels is increased during turns with high lateral acceleration to induce positive slip of the rear wheels to control yaw motion of the vehicle body.

Therefore, traction control which reduces an engine power in response to slippage of the rear wheels in addition to the torque split control which positively promotes the driven wheel slippage causes disenabling of the essential yaw control effected by the torque split control. In other words, these two control systems work against each other, preventing effective utilization of both types of control.

SUMMARY OF THE INVENTION

It is accordingly one object of the present invention to avoid the disadvantages of the prior art.

It is another object of the invention to provide a four-wheel drive vehicle which includes both a torque split control system and a traction control system which is adapted for preventing excessive yaw during turning, which causes a vehicle turning circle to become unacceptably wide, caused by four-wheel drift out during turns with sudden acceleration inducing sidelong forces on the wheels, or during turns on roads having a low friction coefficient, while ensuring yaw control of a vehicle body by means of the torque split control.

According to one aspect of the present invention, there is provided a combination of a torque split system and a traction control system for an automotive vehicle which comprises a slippage sensor means for monitoring slippage of driven wheels to provide a signal indicative thereof, a torque split means for distributing an engine torque to front and rear wheels by an engine torque distribution ratio of front to rear wheels variable based on a degree of slippage monitored by the slippage sensor means, and a traction control means responsive to slippage, created at the driven wheels to which the engine torque is distributed by the torque split means, greater than a preselected slippage threshold for performing traction control.

According to another aspect of the invention, there is provided a combination of a torque split system and a traction control system for an automotive vehicle which comprises a wheel speed sensor means for monitoring rotational speeds of front and rear wheels to provide signals indicative thereof, a torque split means including clutch means disposed either between the front wheels and an engine or between the rear wheels and the engine for distributing an engine torque to the front and rear wheels by an engine torque distribution ratio of front to rear wheels variable based on a difference in the rotational speeds between the front and rear wheels which is determined based on the signals from the wheel speed sensor means, a slippage sensor means for monitoring slippage of the wheels to which the engine torque is transmitted through the clutch means to provide a signal indicative thereof, and a traction control means responsive to a degree of slippage of the wheels to which the engine torque is transmitted through the clutch means being greater than a slippage threshold to control traction of the wheels based on the degree of slippage.

DESCRIPTION OF THE PREFERRED EMBODIMENT

Figure 1:
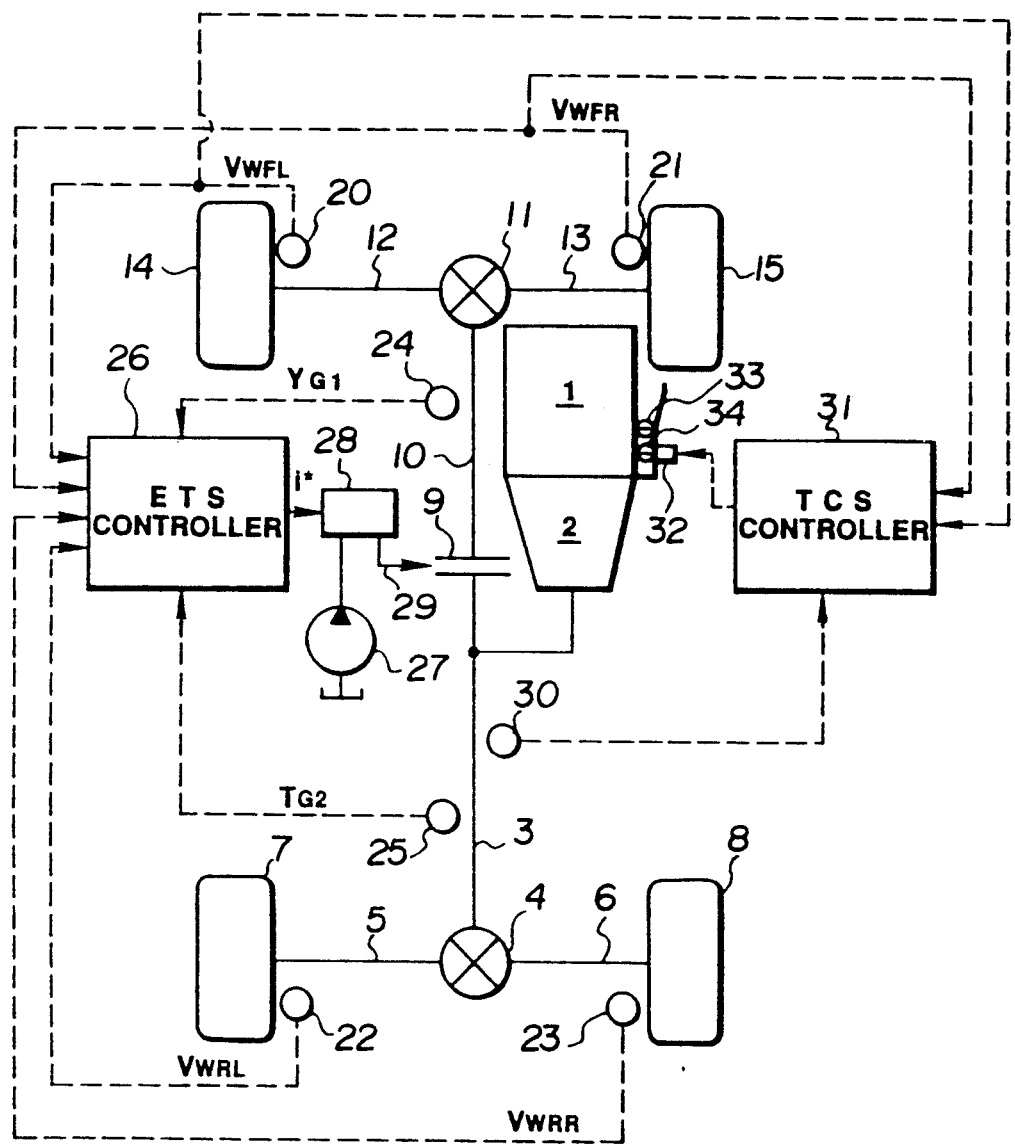
FIG. 1 is a block diagram which shows a traction control system according to the present invention.

Referring now to the drawings, particularly to FIG. 1, a traction control system for a four-wheel drive (4WD) vehicle in which a torque split control system is incorporated is shown. This vehicle is provided with a power train which includes generally an engine 1, a transmission 2, a rear-propeller shaft 3, a rear differential gear 4, rear drive shafts 5 and 6, rear left and right wheels 7 and 8, a wet multiple-disc clutch 9 (driving torque split variable clutch), a front-propeller shaft 10, a front-differential gear 11, front drive shafts 12 and 13, and front left and right wheels 14 and 15.

An engine power, or driving torque is transmitted directly to the rear wheels 7 and 8 while it is transmitted to the front wheels 14 and 15 through the wet multiple-disc clutch 9. It will be appreciated that controlling engagement of the wet multiple-disc clutch 9 by means of hydraulic pressure causes torque distribution between the front and rear wheels to be varied continuously within a range of front to rear torque distribution ratios of 0:100 at zero hydraulic pressure (only rear wheels being driven) to 50:50 at maximum hydraulic pressure (an equalized 4WD state).

The torque split system includes generally an electronic control system which is provided with an ETS (Electronic Torque-split System) controller 26, a front left wheel speed sensor 20, a front right wheel speed sensor 21, a rear left wheel speed sensor 22, a rear right wheel speed sensor 23, first and second lateral acceleration sensors 24 and 25, and a hydraulic system which is provided with an oil pump 27, a solenoid valve 28, and a control pressure line 29.

The speed sensors 20 to 23 are operable to monitor rotational speeds of the wheels respectively to provide a front left wheel rotational speed $v_{WFL}$ signal, a front right wheel rotational speed $v_{WFR}$ signal, a rear left wheel rotational speed $v_{WRL}$ signal, a rear right wheel rotational speed $v_{WRR}$ signal respectively. The first lateral acceleration sensor 24 monitors a lateral acceleration acting on a front position of a vehicle body to provide a first lateral acceleration $Y_{G1}$ signal. The second lateral acceleration sensor 25 monitors a lateral acceleration acting on a rear position of the vehicle body to provide a second lateral acceleration $Y_{G2}$ signal indicative thereof.

The ETS controller 26 is responsive to signals from the speed sensors 20 to 25 to control the engagement of the wet multiple-disc clutch 9 based on a difference $\Delta N$ in rotational speeds between the front and rear wheels (representing slippage of driven wheels) and a lateral acceleration $Y_G$ (representing cornering conditions) so that torque $T_f$ delivered to the front wheels 14 and 15 is increased according to increase in the front-rear wheel rotational speed difference $\Delta N$, with a gain K of the front delivered torque $T_f$, dependent upon the front-rear wheel rotational speed difference $\Delta N$, is decreased according to increase in the lateral acceleration $Y_G$.

The traction control system is adapted for reducing driving torque transmitted through the wheels to a road surface for restricting wheel spin. This system includes generally a Traction Control System (TCS) controller 31, the front left wheel rotational speed sensor 20, the front right wheel rotational speed sensor 21 which are common to the ETS controller, a longitudinal acceleration sensor 30, a control actuator provided with a step motor 32 for operating the second throttle valve 34 of a tandem throttle valve disposed in an inlet passage of the engine 1. A first throttle valve 33 of the tandem throttle valve being mechanically connected to an acceleration pedal (not shown) of the vehicle to be opened and closed according to pedal motion.

The TCS controller 31 is responsive to a front-wheel slippage ratio $S_F$ of the front wheels 14 and 15 greater than a slippage threshold $S_O$ to provide a signal requiring a closing operation of the second throttle valve 34 by the step motor 32 for reducing the engine power.

Figure 2:
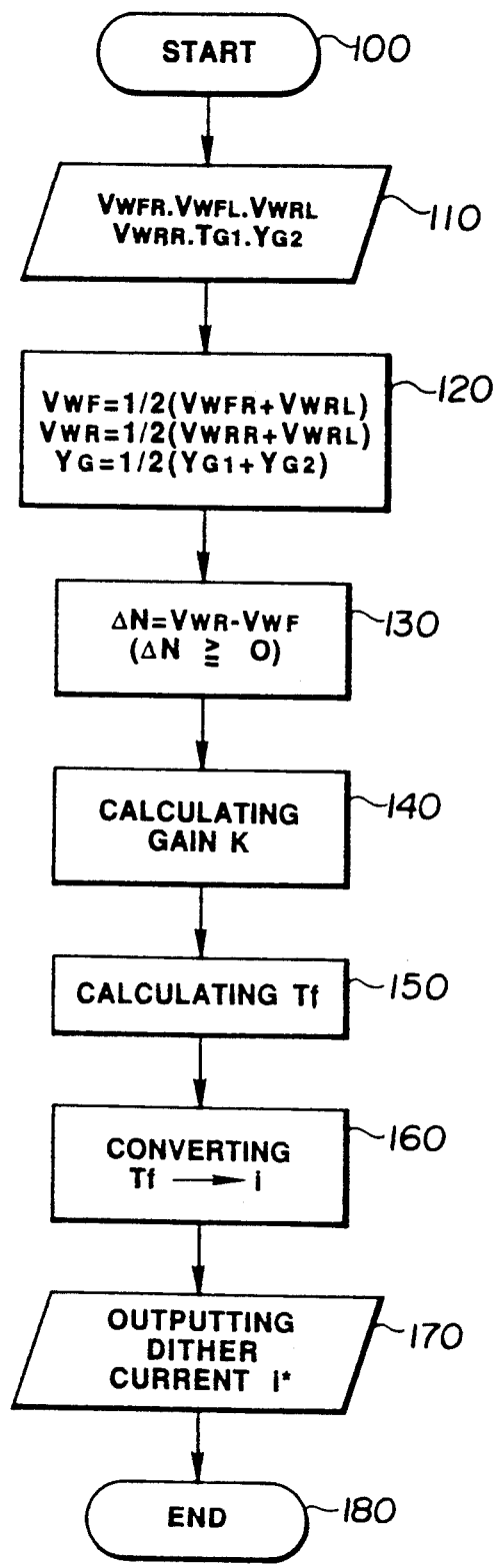
FIG. 2 is a flow chart of a program or sequence of logical steps by an Electronic Torque Split (hereinafter ETS) controller every preselected cycle.

Referring to FIG. 2 a flowchart of a program or sequence of logical steps by the ETS controller 26 every preselected cycle will be described.

After entering the program in step 100, the routine proceeds to step 110 wherein the wheel rotational speed $v_{WFL}$, $v_{WFR}$, $v_{WRL}$, and $v_{WRR}$ signals, the first lateral acceleration $Y_{G1}$, and the second lateral acceleration $Y_{G2}$ signals are input to the controller 26.

The routine then proceeds to step 120 wherein a front-wheel speed $v_{WF}$ is determined by averaging the front left wheel rotational speed $v_{WFL}$ and the front right wheel rotational speed $v_{WFR}$, a rear-wheel speed $v_{WR}$ is determined by averaging the rear left wheel rotational speed $v_{WRL}$ and the rear right wheel rotational speed $V_{WRR}$, and a lateral acceleration $Y_G$ is determined by averaging the first and second lateral accelerations $Y_{G1}$ and $Y_{G2}$.

The routine then proceeds to step 130 wherein the front rear-wheel rotational speed difference $\Delta N$ ($= v_{WR} - v_{WF} \Delta N \geq 0$) is calculated by subtracting the rear-wheel speed $v_{WR}$ by the front-wheel speed $v_{WF}$.

Figure 3:
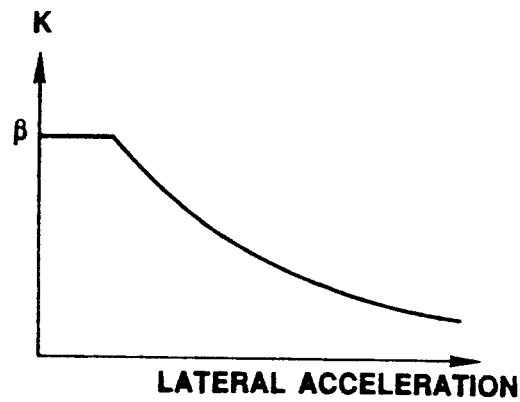
FIG. 3 is a graph which shows a gain characteristic relative to lateral acceleration according to ETS control.

The routine then proceeds to step 140 wherein the gain K of the delivered front-wheel torque $T_f$ dependent upon the front rear-wheel rotational speed difference $\Delta N$ is mathematically calculated based on a function shown by a curve ($K \leq \beta$) in FIG. 3. Alternatively, it may be determined according to the following equations.

$$K = f_1(Y_G)$$

where if $0 \leq Y1$, then $K = Ka$, if $Y1 \leq Y_G < Y2$, then $K = Kb$, if $Y2 \leq = Y_G$, then $K = Kc$ ($Ka < Kb < Kc$). or $$K = Ka/Y_G$$

where $K < Ka$.

The routine then proceeds to step 150 wherein the front-wheel delivered torque $T_f$ is mathematically determined by multiplying the gain K by the front rear-wheel rotational speed difference $\Delta N$ ($T_f = K \times f(\Delta N)$). This equation represents a characteristic as shown in FIG. 4.

The routine then proceeds to step 160 wherein the front-wheel delivered torque $T_f$ derived in step 150 is converted into a current i for exciting a solenoid of the solenoid valve 28.

The routine then proceeds to step 170 wherein a dither current i* for example, $i \pm 0.1$A 100Hz) is output to the solenoid valve 28 to engage the clutch 9 for transmitting a torque to the front wheels which corresponds to the front-wheel delivered torque $T_f$. The program terminates in step 180.

Figure 4:
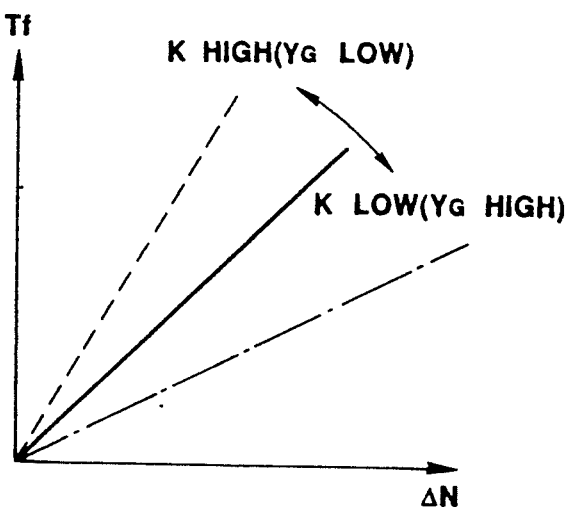
FIG. 4 is a graph which shows a relation between torque delivered to front wheels and a difference in rotational speeds between front and rear wheels according to ETS control.

With this control of engagement of the clutch 9, when the lateral acceleration $Y_G$ is great, during turning with acceleration on a road having a high friction coefficient for example, an increase ratio of the front-wheel delivered torque $T_f$ is low relative to increase in the front rear-wheel rotational speed difference $\Delta N$ as shown by a dashed line in FIG. 4. This causes the delivered torque to be transmitted to the rear wheels 7 and 8 more than to the front wheels 14 and 15 to allow the rear wheels 7 and 8 to slip so as to reduce sidelong forces thereof for reducing a moment about a yaw axis.

When low lateral acceleration $Y_G$ acts on the vehicle body during turning on a road having a low friction coefficient, an increase ratio of the torque $T_f$, delivered to the front-wheels is great relative to increase in the front rear-wheel rotational speed difference $\Delta N$ and greater driving torque is delivered to the front wheels 14 and 15 to restrict slippage of the rear wheels 7 and 8 so as to increase sidelong force thereof, increasing a moment about the yaw axis.

It will be appreciated that a moment about the yaw axis is controlled so as to obtain an optimum steering characteristic equivalent to vehicular behavior in neutral steering.

Figure 5:
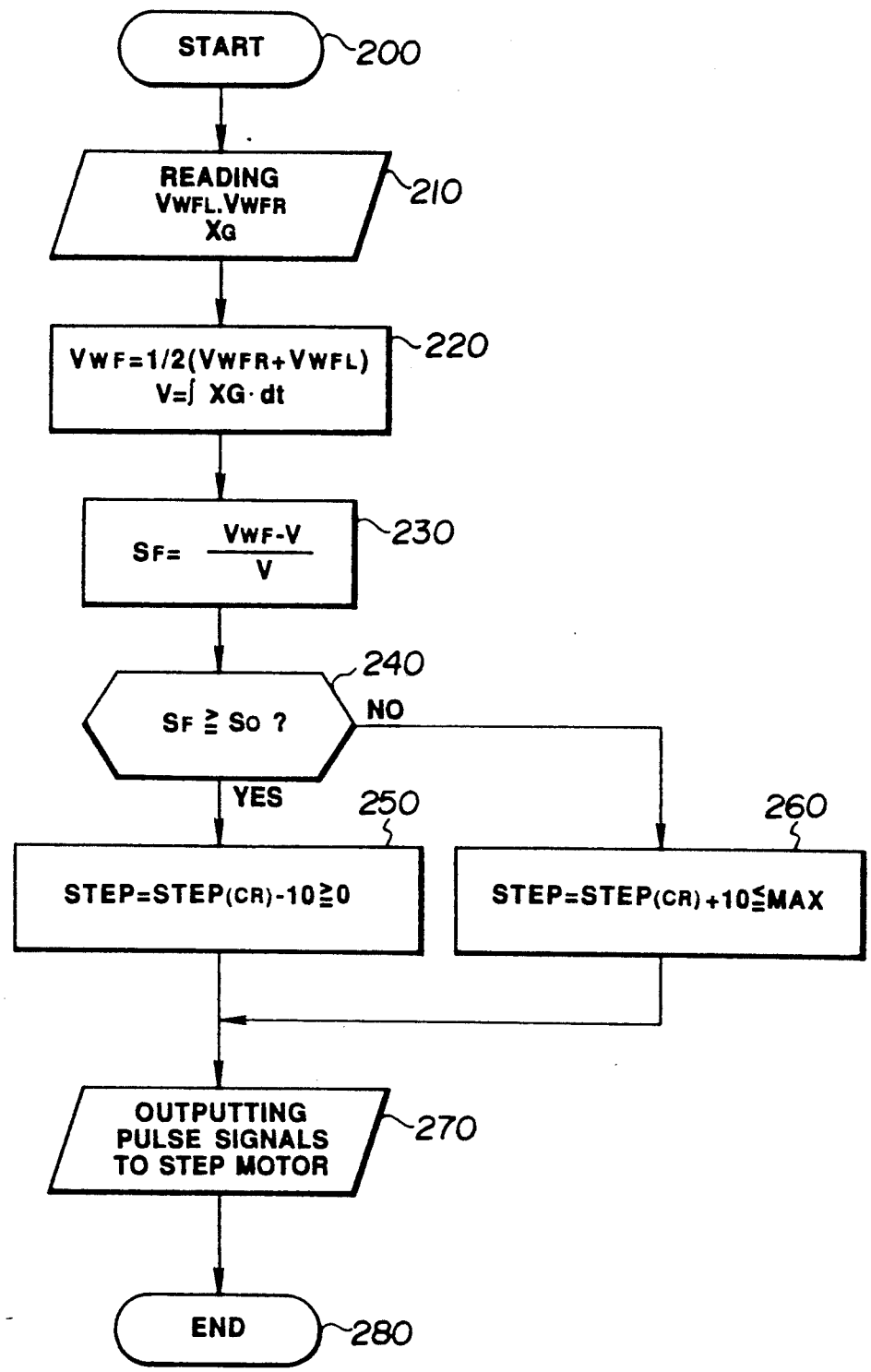
FIG. 5 is a flow chart of a program, or sequence of logical steps, by a traction controller every preselected cycle.

Referring to FIG. 5, a flowchart of a program or sequence of logical steps performed by the TCS controller 31 every preselected cycle, for example 10 (msec.) will be described.

After entering the program in step 200, the routine proceeds to step 210 wherein the front left wheel rotational speed $v_{WFL}$, front right wheel rotational speed $V_{WFR}$, and the longitudinal acceleration $X_G$ signals are input to the TCS controller 31.

The routine then proceeds to step 220 wherein a front-wheel speed $v_{WF}$ is mathematically calculated by averaging the front left wheel rotational speed $v_{WFL}$ and the front right wheel rotational speed $v_{WFR}$ and the longitudinal acceleration $X_G$ is mathematically integrated to determine a vehicle body speed V (ground speed of the vehicle body).

The routine then proceeds to step 230 wherein a front-wheel slippage ratio $S_F$ is determined based on the front-wheel speed $v_{WF}$ and the vehicle body speed v according to the following equation.

$$S_F = (v_{WF} - V)/V$$

The routine then proceeds to step 240 wherein it is determined as to whether the front-wheel slippage ratio $S_F$ derived in step 230 is more than or equal to a slippage ratio threshold $S_O$.

If a YES answer is obtained ($S_F \geq S_O$), the routine then proceeds to step 250 wherein the step motor 32 is moved negatively from its current position (STEP$_{(CR)}$) by a number of steps, e.g. ten steps, (STEP$_{(CR)} - 10 \geq 0$) to provide a number of steps for driving the step motor 32 in a reverse direction to close the second throttle valve for reducing the engine power.

If a NO answer is obtained ($S_F < S_O$), the routine then proceeds to step 260 wherein the step motor 32 is moved positively by the same number of steps, e.g. ten, from its current position (STEP$_{(CR)} + 10 <$ MAX) to provide a number of steps for driving the step motor 32 in a normal direction to open the second throttle valve.

Subsequently, the routine proceeds to step 270 wherein pulse signals corresponding to the number of steps derived in step 250 or 260 (i.e., 10 steps) are output to the step motor 32 to control opening or closing of the second throttle valve 34 by the determined number of steps. The program terminates in step 280.

It will be noted that engine power is reduced by controlling the second throttle valve 34 when the front-wheel slippage ratio $S_F$ is more than or equal to the slippage ratio threshold $S_O$.

Therefore, even if driven wheel slippage is created at the rear wheels 7 and 8 which are connected directly to the engine, traction control is not made unless the wheel spinning is generated at the clutch-connected front wheels 14 and 15, and the torque split control maintains the yaw control of the vehicle.

However, when the wheel spinning is created at the front wheels 14 and 15 during turns with sudden acceleration or during turns on a road having a low friction coefficient regardless of driving torque being distributed equally to the front and rear wheels, the traction control reduces the engine power to increase the sidelong forces of the wheels so as to restrict a turning circle from excessive widening caused by four-wheel drift out.

Four-wheel drift out means that excess engine power is transmitted to both front and rear wheels. The amount of the wheel spin at the front wheels 14 and 15 is estimated so that side forces thereof are reduced to cause the four-wheel drift out to occur, swelling the turning circle.

As a result, until the four-wheel drift out is estimated, the yaw control of the vehicle body is not restricted by the torque split control and the swelling of the turning circle, and four-wheel drift out, during turns with sudden acceleration or during turns on roads having a low friction coefficient inducing side forces to be reduced, is restricted effectively by the traction control.

While the present invention has been disclosed in terms of the preferred embodiment in order to facilitate better understanding thereof, it should be appreciated that the invention can be embodied in various ways without departing from the principle thereof.

For example, in the above embodiment, the ETS and TCS controllers are provided separately. Both of them may be however integrated into a single controller.

Additionally, while in the above embodiment a four-wheel drive vehicle which gives priority to rear wheel driving is provided, the system of the invention may be applicable to a four-wheel drive vehicle which gives priority to front wheel driving.

Further, while in the above embodiment a wet multiple-disc clutch is used which is variable of delivered torque by means of external hydraulic pressure control, a viscous-type clutch, an orifice-type clutch, or an electromagnetic clutch may be applicable if they can be controlled from the outside to shift a delivered torque.

Further, while in the above embodiment the second throttle valve of the tandem throttle valve is operated to control the engine power, for example a fuel-cut control, an ignition timing control a single throttle valve, control for shifting a gear toward a high ratio in an automatic transmission, or a combination thereof may be utilized in the present invention.

Furthermore, while in the above embodiment the front-wheel speed is obtained by averaging the front left and right wheel rotational speeds for the traction control, in a case where stable control in favor of the traction control is effected so as not to swell a turning circle of a vehicle, a faster wheel speed than the front left and right wheels may be selected as the front-wheel speed to reduce the sidelong forces of the front wheels due to wheel spin at an early stage. On the other hand, in a case where yaw control is sufficiently used by control giving weight to the torque split control, a lower wheel speed than the front left and right wheels may be selected as the front-wheel speed to effectively utilize traction of the front outside wheel during turning for example.

Additionally, while in the above embodiment the front wheel slippage $S_F$ is obtained based on the front-wheel speed and the vehicle body speed, it may be estimated as a function of an engagement force of the clutch as follows.

Assuming that a front-wheel delivered torque is $T_f$, a vehicle weight is $W_f$, a radius of a tire in a static weight is r, and a rigidity coefficient of a tire in braking or driving conditions, the front-wheel slippage is given by the following relation.

$$S_F = \frac{1}{k \times r} \times \frac{T_f}{W_f} \quad (1)$$

Assuming that a driving force of a tire $Q_f$ and a friction coefficient between a tire and a road surface is $\mu_f$, the front-wheel delivered torque is represented by the following relation.

$$T_f = Q_f \times r = \mu_f \times W_f \times r \quad (2)$$

Thus, from the equations (1) and (2), $$S_F = \mu_f / K \quad (3)$$

The braking-driving tire rigidity coefficient K is variable dependent upon the tire-road surface friction coefficient $\mu_f$ and/or a slip angle of a tire. Accordingly, K may be obtained as a function of the lateral acceleration $Y_G$ and the front rear-wheel rotational speed difference $\Delta N$ as follows.

$$K = f(Y_G, \Delta N) = 20 + Y_G - A \times \Delta N$$

It will be noted that the front-wheel slippage ratio $S_F$ is estimated as the engagement force of the clutch.

As previously mentioned, with the system, incorporating traction control and torque split control, according to the present invention, a certain slippage value of wheels connected to a clutch which splits a driving torque to front and rear wheels is provided as a slippage threshold, when slippage of the clutch connected wheels exceeds the slippage threshold, that is, when slippage is created at all four wheels more than a certain value, traction control is effected to reduce engine power. Thus, widening of a turning circle, due to four-wheel drift out which tends to occur during turns with sudden acceleration causing sidelong forces to be reduced or during turns on a road having a low friction coefficient, is prevented by traction control while still establishing yaw control of the vehicle body via torque split control.

What is claimed is:

1. A combination of a torque split system and a traction control system for an automotive vehicles, said vehicle including pairs of front and rear wheels, one of said pair being a primary driven wheel pair and the other being an auxiliary driven wheel pair, comprising:
   rotational speed difference means for determining a rotational speed difference between said primary and auxiliary driven wheel pairs to provide a signal indicative thereof; torque split means responsive to the signal from said rotational speed difference determining means for distributing an engine torque to wheels of said primary and auxiliary driven wheel pairs by an engine torque distribution ratio variably based on a degree of the rotational speed difference determined by said rotational speed difference determining means;
   slippage determining means for determining slippage of said auxiliary driven wheels, to which said engine torque is distributed by said torque split means, relative to a vehicle speed to provide a signal indicative of a degree of slippage; and
   traction control means responsive to the signal from said slippage determining means which is greater than a preselected slippage threshold for performing traction control,
   wherein said slippage determining means is selectively responsive to (i) a rotational speed of a faster one of said auxiliary wheels, (ii) a rotational speed of a slower one of said auxiliary wheels and (iii) an averaged rotational speed of said auxiliary wheels to provide said signal indicative of a degree of slippage.

2. A combination of a torque split system and a traction control system for an automotive vehicles, said vehicle including pairs of front and rear wheels, one of said pair being a primary driven wheel pair and the other being an auxiliary driven wheel pair, comprising:
   rotational speed difference means for determining a rotational speed difference between said primary and auxiliary driven wheel pairs to provide a signal indicative thereof;
   torque split means responsive to the signal from said rotational speed difference determining means for distributing an engine torque to wheels of said primary and auxiliary driven wheel pairs by an engine torque distribution ratio variably based on a degree of the rotational speed difference determined by said rotational speed difference determining means;
   slippage determining means for determining slippage of said auxiliary driven wheels, to which said engine torque is distributed by said torque split means, relative to a vehicle speed to provide a signal indicative of a degree of slippage;

traction control means responsive to the signal from said slippage determining means which is greater than a preselected slippage threshold for performing traction control, said rotational speed difference determining means including speed sensor means for monitoring rotational speeds of the primary and auxiliary driven wheel pairs respectively to determine the rotational speed difference between the primary and auxiliary driven wheel pairs, said torque split means bringing the engine torque distribution ratio of the primary to auxiliary wheel pairs toward 1:1 according to increase in the rotational speed difference between the primary and auxiliary wheel pairs, said torque split means including clutch means disposed between the auxiliary driven wheel pair and an engine, said torque split means controlling engagement of the clutch means to transmit engine torque to the auxiliary wheel pair according to the engine torque distribution ratio;

vehicle speed sensor means for monitoring a vehicle speed to provide a signal indicative thereof, said slippage determining means being responsive to the signals from said speed sensor means of said slippage sensor means and said vehicle speed sensor means to provide a slippage ratio defined by the rotational speed of the auxiliary driven wheel pair relative to the vehicle speed and providing the signal indicative of the slippage ratio, said traction control means being responsive to the signal from said slippage determining means which represents a slippage ratio greater than the preselected slippage threshold, to reduce engine torque to control traction of the wheels, said vehicle speed sensor further including a longitudinal acceleration sensor which monitors longitudinal acceleration acting on a vehicle body and mathematically integrates the longitudinal acceleration to determine the vehicle speed; and means for selectively providing to said slippage determining means (i) a rotational speed of a faster one of said auxiliary wheels, (ii) a rotational speed of a slower one of said auxiliary wheels and (iii) an averaged rotational speed of said auxiliary wheels as said rotational speed of said auxiliary wheels.

3. A combination of a torque split system and a traction control system for an automotive vehicle, said vehicle including pairs of front and rear wheels, one of said pair being a primary driven wheel pair and the other being an auxiliary driven wheel pair, comprising:

wheel speed sensor means for monitoring rotational speeds of said primary and auxiliary driven wheels to provide signals indicative thereof;

torque split means including clutch means disposed between the auxiliary driven wheels and an engine responsive to the signals from said wheel speed sensor means for distributing an engine torque to the auxiliary driven wheels by an engine torque distribution ratio of primary to auxiliary driven wheels variably based on a difference in the rotational speeds between the primary and auxiliary driven wheels which is determined based on the signals from said wheel speed sensor means;

slippage sensor means for monitoring slippage of the auxiliary driven wheels relative to a vehicle speed to provide a signal indicative thereof; and traction control means responsive to the signal from said slippage sensor means being greater than a slippage threshold to control traction of the wheels based on said degree of slippage, wherein said slippage sensor means is selectively responsive to (i) a rotational speed of a faster one of said auxiliary wheels, (ii) a rotational speed of a slower one of said auxiliary wheels and (iii) an averaged rotational speed of said auxiliary wheels to provide said signal indicative of slippage of said auxiliary wheels.

4. A combination of a torque split system and a traction control system for an automotive vehicle, said vehicle including pairs of front and rear wheels, one of said pair being a primary driven wheel pair and the other being an auxiliary driven wheel pair, comprising:

wheel speed sensor means for monitoring rotational speeds of said primary and auxiliary driven wheels to provide signals indicative thereof;

torque split means including clutch means disposed between the auxiliary driven wheels and an engine responsive to the signals from said wheel speed sensor means for distributing an engine torque to the auxiliary driven wheels by an engine torque distribution ratio of primary to auxiliary driven wheels variably based on a difference in the rotational speeds between the primary and auxiliary driven wheels which is determined based on the signals from said wheel speed sensor means;

slippage sensor means for monitoring slippage of the auxiliary driven wheels relative to a vehicle speed to provide a signal indicative thereof; and traction control means responsive to the signal from said slippage sensor means being greater than a slippage threshold to control traction of the wheels based on said degree of slippage, wherein said slippage sensor means includes vehicle speed sensor means for monitoring vehicle speed to determine the slippage of said auxiliary driven wheels based on a difference in the rotational speed of said auxiliary driven wheels and the vehicle speed and providing a signal indicative thereof, said slippage sensor means including vehicle speed sensor means for monitoring vehicle speed to determine the slippage of said auxiliary driven wheels based on a difference in the rotational speed of said auxiliary driven wheels and the vehicle speed and providing a signal indicative thereof, wherein said slippage determining means is selectively responsive (i) a rotational speed of a faster one of said auxiliary wheels, (ii) a rotational speed of a slower one of said auxiliary wheels and (iii) an averaged rotational speed of said auxiliary wheels to provide said signal indicative of slippage of said auxiliary wheels.

* * * * *